Oct. 18, 1966 R. C. CHANAUD 3,279,251
CONTROLLED PRECESS DEVICE
Filed Oct. 16, 1963

INVENTOR
Robert C. Chanaud
BY Eli Weiss
ATTORNEY

United States Patent Office 3,279,251
Patented Oct. 18, 1966

3,279,251
CONTROLLED PRECESS DEVICE
Robert C. Chanaud, North Branch Stations, N.J., assignor to American Radiator & Standard Sanitary Corporation, New York, N.Y., a corporation of Delaware
Filed Oct. 16, 1963, Ser. No. 316,640
15 Claims. (Cl. 73—194)

This invention relates to a volumetric flow measuring device and more particularly to a swirl flow type of volumetric flow measuring device.

Presently, there are several basically different ways of metering the flow of fluids in closed conduits. These include inferential mechanical meters such as the turbine type, the pressure differential meters such as the Venturi and Dall tube and then those of more recent origin such as the ultrasonic flow meter.

One type of inferential mechanical meter is the turbine flow meter. This meter has a set of rotatable blades on a shaft which is coaxial with the pipe in which it is located and, therefore, moving parts are required. When the fluid that is to be measured is moving through the pipe, there is an exchange of momentum which causes blade rotation. This force is balanced by viscous losses on the blades, and mechanical friction in the shaft bearings. The speed of rotation of the blades is generally directly proportional to the flow rate, i.e., a linear relationship and by the use of a magnetic pickup device in the pipewall the passage of a blade can be detected. This adds electromagnetic loading to the bearing friction as resistive forces. If a suitable time scale is provided, both the total number of pulses and the number of pulses per minute can be counted. This digital output can be made to indicate both total flow and flow rate and, by conversion to an analog signal, can be automatically recorded. Published evidence suggests that the device can deviate at least 8% from linearity over a flow rate range of 1.8 to 10. The lower limit of the linear range occurs when the bearing friction and electromagnetic loading forces become an appreciable percentage of the fluid forces. The normal artifice used to extend the useful lower limit of flow rate is to have a center body in the pipe which reduces the pipe cross sectional area and therefore increases the fluid momentum. This, of course, requires an additional pressure drop which is not entirely recoverable downstream. The purpose of this area restriction is to insure that the flow velocities are high enough to maintain turbulence, since transition to laminar flow changes the drag losses on the blades and thereby affects the linearity. Because the ratio of torque to bearing friction is low for gases it appears to be rather difficult to obtain a reasonably broad linear response range. Thus, this type of meter is generally restricted to the measurements of liquids. In addition, linearity for liquids is affected not only by flow rates but also small meter sizes and high viscosities. This is due to the fact that the Reynolds number is the important parameter.

A number of error sources are present in turbine flow meter. The first is due to swirl of the entering flow since this alters the momentum exchange at the blades. To obtain high accuracy the upstream swirl must be greatly reduced by the use of flow straighteners or a long laying length of upstream pipe. However, these corrections introduce additional pressure losses. Deviations as great as 2% are found even with small amounts of swirl; the deviation depending upon straightener design. Bearing wear causes variations in the mechanical friction force and affects the meter calibration, notably at low flow rates. Additionally, gum forming fluids will also change the bearing friction load. Cavitation in liquids causes changes in the meter response so static pressures sufficient to avoid this are necessary.

In summary, the turbine flow meter has the following disadvantages:

Subject to errors due to swirl;
Requires moving parts which are subject to wear and affected by gum deposits;
Is best adapted to measure only the flow of liquids; and Requires turbulent flow;
Is subject to loss of calibration with time.

Under those meters classified as the Pressure Differential Meters there are the Venturi, Orifice plate, Nozzle, Dall, Laminar flow and Lo-Loss meters. The first three are the most commonly used and well known of this class of meters. The latter three are more recent variations which attempt to improve one facet or another of the first three.

In the Pressure Differential Meters the flow rate is inferred from pressure differentials across a flow restriction and, therefore, the response is a square root function, i.e., non-linear. The measurement of pressure provides an analog output which is generally not suitable for remote transmission although it is simple to measure. Generally, the pressure differential is detected through a hydraulic sensing device such as a manometer. This device generally makes the response time of the system quite long. The indicating column fluid must be denser than the fluid of interest and, therefore, it requires a longer time to accelerate. Additionally, it is sensitive only to the low frequencies which are associated with these longer times.

A primary source of error in this type of device is the deviation from a uniform velocity profile at the entrance to the metering element.

However, in an effort to maintain brevity, it can be stated that the disadvantages of pressure differential type of meters can be categorized as follows:

Low accuracy (relative to a turbine meter);
Non-linear response;
Relatively long response time;
Not suitable for low flow rates and small cross sectional area pipes;
Provides an analog output which is not the most suitable form for remote use;
Is subject to errors due to non-uniformity in the flow; and Requires Reynolds numbers well into the turbulent flow range.

Other types of meters used to measure flow are the electromagnetic and ultrasonic flow meters.

The electromagnetic flow meter is based on the principle that a moving conductor in a magnetic field will generate an electromotive force. The generated potential is directly proportional to the flow rate and since the entire device is electrical in nature, it introduces no head loss in the pipe. However, to set up a magnetic field requires a high power input and, of course, a conductive medium is required which naturally eliminates its use with oil, air or steam. Obviously, this requirement restricts the meters application.

Thus, the electromagnetic flow type of meter uses a large amount of power, requires a conductive media, and generates an analog output.

In the ultrasonic flow meter a transducer is positioned within the wall of a pipe upstream of and diametrically opposite another transducer. Equipment is provided to measure the propagation time of an acoustic wave in traveling from one transducer to the other. Since acoustic waves are convected with the speed of the gross fluid motion, the transmission time depends on the sum (or difference) of the sound speed and the integrated average fluid speed. From this the fluid velocity can be inferred. However, two possible sources of error which arise are: (1) Inaccurate knowledge of the sound speed since this speed is determined by the properties of the fluid, and (2) the fact that the total transit time and therefore the accuracy of the device depends on the velocity profile of the fluid which, generally, can not be accurately determined.

It is an object of this invention to provide a flow meter which has a high degree of accuracy, i.e., better than 0.5%;

It is another object of this invention to provide a flow meter which has a virtually linear response;

It is still another object of this invention to provide a flow meter which can be used with all homogeneous fluids;

It is also an object of this invention to provide a flow meter which has a short response time;

It is also another object of this invention to provide a flow meter which provides a digital output suitable for remote transmission;

It is an additional object of this invention to provide a flow meter which can operate in either laminar or turbulent flow and across the flow rate range where transition from one to the other occurs;

It is another object of this invention to provide a flow meter which does not have any moving parts;

It is still another object of this invention to provide a flow meter which has improved resistance to loss of calibration with time;

It is also an object of this invention to provide a flow meter which can be used on practically any size pipe and over a broad flow rate range;

It is still another object of this invention to provide a flow meter which is inherently less subject to pulsation errors than non-linear devices or the turbine flow meter.

Other objects and many of the attendant advantages of this invention will be readily appreciated as the apparatus becomes better understood by reference to the following detailed description when considered in connection with the accompanying drawings wherein.

Figure 4:
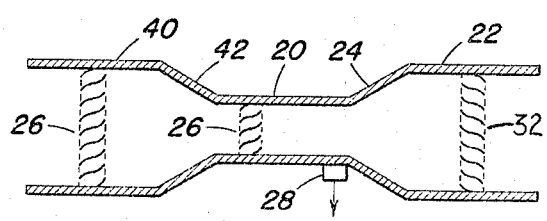
Figure 5:
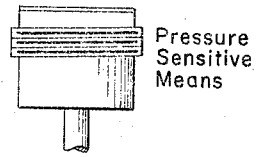
Figure 6:
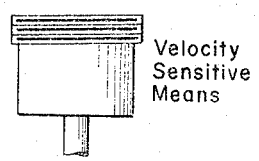

FIG. 4 also illustrates another embodiment of the structure of this invention; and FIGS. 5 through 8 illustrate sensor means which can be used with the structure of this invention.

Briefly, in this invention, the fluid whose flow rate is to be measured is first forced to assume a swirl component by converting pressure energy into kinetic energy, and is then permitted to flow into a conductor of different cross-sections area. This flow promotes a particular kind of hydrodynamic instability which causes the low pressure center of the swirling fluid to precess at a discrete frequency about the conductor centerline, i.e., if the center of the swirling flow were made visible by suitable means it would be observed to trace out a conical shape at the change in conductor area. In other words, the spin axis of the swirling fluid rotates around the conductor centerline. Such a phenomenon is described in "A Vortex Whistle," B. Vonnegut, Journal of the Acoustical Society of America, vol. 26, 1954, pp. 18–20; and "Experiments Concerning the Vortex Whistle," R. C. Chanaud, Journal of the Acoustical Society of America, vol. 35, No. 7, pp. 953–960.

This precession shall here be referred to as swirl precession. The rate or frequency of precession or the rate at which the center of the swirl flow rotates about the center of the pipe is, in certain cases, directly proportional to the mean flow rate of the fluid. A suitable sensor means in the fluid, preferably in the pipe wall and in contact with the fluid, can detect this cycling of the swirl precession and can be made to transmit a signal to a device which can then indicate the flow rate. The sensor means is responsive to a fluid parameter fluctuation. By fluid parameter is hereinafter meant pressure, or temperature, or velocity. It has been found that good results were obtained when the sensor means was positioned immediately upstream of the area change.

Figure 1:
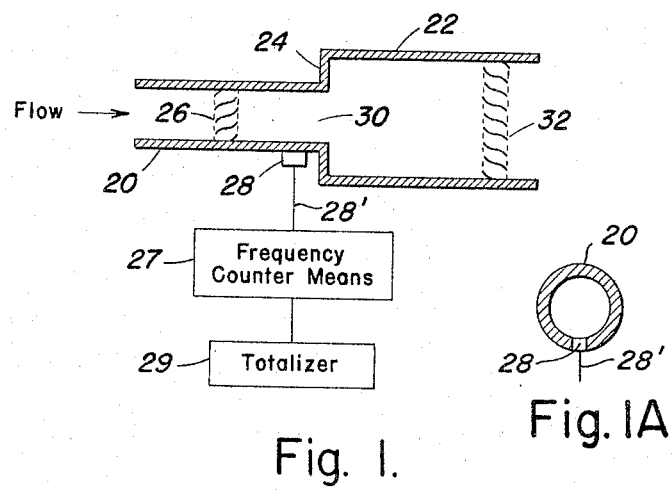
FIG. 1 is a drawing of structure in accordance with the principles of this invention.

With reference to FIG. 1 there is illustrated structure in accordance with the principles of this invention. A first fluid conductor means 20 and a second fluid conductor means 22—the second conductor means having an internal diameter larger than the internal diameter of the first conductor—can be coupled together through an abrupt coupling means 24 such as a wall member positioned at substantially right angles to each of the conductors. Swirl means 26 are coupled to the first fluid conductor means 20 to force the fluid flowing through the first conductor into a swirling motion. The swirl means can be in the form of fixed blades positioned within the conductor means 20, or convolutions positioned within the interior surface of the conductor means 20 or vanes positioned across the interior surface of the conductor means 20. It has been found that the linearity of this device is determined by the design of the swirl means. For example, a linear device is obtained if fixed blades with a given exit angle with respect to the pipe axis are used. Sensor means 28 is positioned to best detect the cycling or frequency of the swirl precession.

Figure 1A:
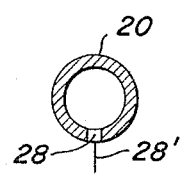
FIG. 1A is a cross-sectional view showing the placement of a sensor means in one of the fluid conductors of FIG. 1.
Figure 7:
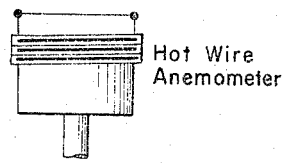
Figure 8:
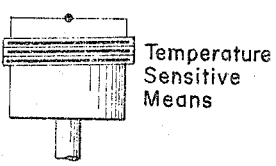

Since the swirling flow is precessing there are velocity, pressure and temperature fluctuations present in the flow. For example, since the pressure in the center of a swirling fluid is lower than elsewhere in the fluid, and since the swirling fluid is precessing, this low pressure center is radially displaced from the conductor centerline and rotates about the conductor centerline. Accordingly, at any given angular position about the conductor the pressure will periodically vary between a maximum and a minimum. Therefore, there are several methods by which the frequency of the swirl precession can be detected. Although it is possible to use a sensor means on the outer wall of the conductor, it is preferable to place the sensor means in contact with the fluid as shown in FIG. 1A. For example, pressure sensitive means shown in FIG. 5 such as a diaphragm pressure transducer or piezoelectric crystal or the like can be utilized to measure the fluctuations of pressure; a velocity sensitive means such as a hot film anemometer, shown in FIG. 6 or hot wire anemometer, as shown in FIG. 7 or the like can be utilized to measure the fluctuations of velocity; or a temperature sensitive means such as a thermocouple, FIG. 8, or the like can be utilized to measure the fluctuations of temperature.

In operation, the fluid whose flow rate is to be determined, is fed to the first fluid conductor means 20 and exits from the second fluid conductor means 22. Swirl means 26 forces the fluid, which can be either gas or liquid, into a swirl condition. The presence of the enlargement 30 which the fluid encounters as it flows out of the first fluid conductor means 20 or first pipe having a substantially circular cross section and into the second fluid conductor means 22—a second pipe having a substantially circular cross section—causes the swirling fluid to become unstable or, in other words, the center or axis of the swirling fluid traces a cone. The greater the rate of flow of the fluid, the faster the axis of the swirling fluid precesses. Since precession is an angular velocity it can be expressed as revolutions per unit time or as a frequency of rotation. Since the sensor means is at a fixed angular position it senses one pressure, temperature or velocity maximum or minimum per revolution. Therefore, these maximums or minimums occur at a frequency related to the rate of flow.

Now, to determine the rate of flow, a frequency counter 27 is fed via lead 28' by the sensing means to count the occurrence of each maximum or minimum, usually in cycles per second, and a totalizer 29 is fed by the frequency counter to provide a total count of the number of cycles present during a specific interval of time. Of course, the transducer generates electric signals and the counter 27, of conventional design, counts these signals. Thus, the frequency counter will indicate the instantaneous rate of flow and the totalizer will indicate the total flow during a specific interval.

If desired, deswirl means 32 can be coupled to the second fluid conductor means 22 to recapture some of the pressure loss which is caused by presence of the swirl means 26. The deswirl means can be in the form of fixed blades positioned within the conductor means 22. Experimentation has disclosed that the deswirl means can be effective in preventing the reflection upstream of undesirable downstream effects.

Figure 2:
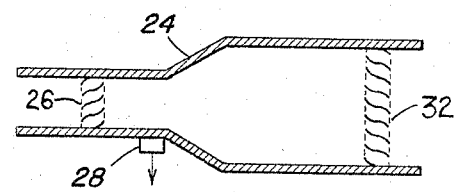
FIG. 2 is an embodiment of the structure of FIG. 1.

Referring now to FIG. 2 there is shown structure wherein the member 24 which couples the first fluid conductor means 20 to the second fluid conductor means 22 is angled to provide a more gradual change in area for the fluid as it flows from conductor means 20 to conductor means 22. It has been found that this more gradual increase in area reduces the pressure drop experienced by the fluid in flowing from the smaller area conduit to the larger area conduit but the operation of the device is otherwise unchanged.

Figure 3:
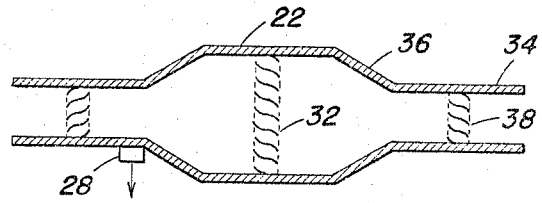
FIG. 3 illustrates still another embodiment of the structure of this invention.

Referring now to FIG. 3, there is illustrated a type of flow meter, in accordance with the principles of this invention, which can be used where the pipe that feeds the fluid to this invention is of the same diameter as the pipe that carries the fluid from this invention. In this embodiment the second fluid conductor means 22 is coupled to an outlet conductor 34 through a connecting means 36 which can be angled or abrupt. In this embodiment the deswirl means can be coupled to the second fluid conductor means 22 as illustrated in FIGS. 1 and 2, or the deswirl means can be positioned within the outlet conductor here illustrated as 38. Practice has disclosed that a length of approximately two diameters for the second fluid conductor means 22 is sufficient to provide good results.

With reference to FIG. 4 there is illustrated structure in accordance with the principles of this invention wherein the first fluid conductor means 20 has a cross sectional area that is smaller than the conductor 40 from which it receives the fluid. The conductor 40 having a substantially circular cross section is coupled to the conductor 20 by means of an inclined connecting means 42, designed to present a minimum pressure drop. In this embodiment, the swirl means 26 can be positioned within the conductor 40 or within the first fluid conductor means 20. The second fluid conductor means 22 is connected to the conductor means 20 through a coupling member 24 designed to provide a minimum of fluid pressure drop. The deswirl means 32 can be positioned within the second fluid conductor means 22. The outlet of the conductor means 22 is connected to a conductor which continues to direct the fluid along a desired path to a specific location. In operation conductor means 22 can have a diameter equal to or different than the diameter at conductor means 40.

In practice, it has been determined that this invention can be used to measure the flow through conductors which range in diameter from one-tenth of an inch up to several feet.

Obviously many modifications and variations of the present invention are possible in the light of the above teachings. It is, therefore, to be understood that within the scope of the appended claims the invention may be practiced otherwise than as specifically described.

What is claimed is:

1. Apparatus for detecting a fluid dynamic property of a flowing fluid comprising a first fluid conductor means having a given cross sectional area and including an upstream end for receiving fluid and a downstream end, swirl means in said first fluid conductor means disposed between said upstream end and said downstream end for forcing fluid to swirl, a second fluid conductor means having a cross sectional area different from the cross sectional area of said first fluid conductor means and including an upstream end and a downstream end for discharging fluid, the upstream end of said second fluid conductor means being coupled to the downstream end of said first fluid conductor means causing the low pressure center of said swirling fluid to be radially displaced from the center line of the conductor means and to rotate about said center line, and sensor means disposed downstream of said swirl means and responsive to fluid parameter fluctuations in the swirling fluid.

2. The apparatus of claim 1 wherein said first fluid conductor means is a cylindrical pipe whose upstream end is an open end of said cylindrical pipe for receiving fluid in a direction along the axis of said cylindrical pipe.

3. Apparatus for measuring the flow of a fluid comprising a first fluid conductor means having a given cross sectional area and including an upstream end for axially receiving fluid and a downstream end, swirl means in said first fluid conductor means disposed between said upstream end and said downstream end for forcing fluid to swirl, a second fluid conductor means having a cross sectional area different from the cross sectional area of said first fluid conductor means and including an upstream end and a downstream end for discharging fluid, the upstream end of said second fluid conductor means being coupled to the downstream end of said first fluid conductor means to cause the low pressure center of the swirling fluid downstream of said swirl means to be radially displaced from the center line of the conductor means and to rotate about said center line, and sensor means disposed downstream of said swirl means and responsive to fluid parameter fluctuations in the swirling fluid which is related to the flow of fluid through said conductor means.

4. The apparatus of claim 3 wherein said sensor means includes a transducer disposed in one of said fluid conductor means.

5. The apparatus of claim 3 wherein said sensor means includes a transducer in contact with the swirling fluid.

6. The apparatus of claim 5 wherein said sensor means includes a transducer disposed in said first fluid conductor means and in contact with the swirling fluid.

7. The apparatus of claim 6 wherein said transducer is a pressure sensitive transducer.

8. The apparatus of claim 6 wherein said transducer is a velocity sensitive transducer.

9. The apparatus of claim 6 wherein said transducer is a hot film anemometer.

10. The apparatus of claim 6 wherein said transducer is a hot wire anemometer.

11. The apparatus of claim 6 wherein said transducer is a temperature sensitive transducer.

12. The apparatus of claim 6 wherein said transducer is a thermocouple.

13. The apparatus of claim 3 further comprising means downstream of said sensor means for urging the swirling fluid to a swirlfree state.

14. The apparatus of claim 3 wherein said sensor means includes: a transducer disposed downstream of said swirl means for generating signals having a frequency related to the frequency at which the radially displaced low pressure center rotates; and signal frequency counter means connected to said transducer means for indicating the frequency of the generated signals which is related to the rate of flow through said fluid conductor means.

15. The apparatus of claim 3 wherein said sensor means includes: a transducer disposed downstream of said swirl means for generating signals having a frequency related to the frequency at which the radially displaced low pressure center rotates; and signal totalizer means connected to said transducer means for totalizing the number of generated signals which is related to the volume of fluid flowing through said fluid conductor means.

References Cited by the Examiner

UNITED STATES PATENTS

| | | | |
|---|---|---|---|
| 2,146,827 | 2/1939 | Kruspi | 73—231 X |
| 2,772,567 | 11/1956 | Boden et al. | 73—231 |
| 2,813,423 | 11/1957 | Altfillisch et al. | 73—194 |
| 2,975,635 | 3/1961 | Kindler et al. | 73—231 X |
| 3,024,656 | 3/1962 | Faure Herman | 73—230 |
| 3,036,460 | 5/1962 | White et al. | 73—231 X |
| 3,084,560 | 4/1963 | Cleveland | 74—5.6 |

FOREIGN PATENTS 404,047 6/1909 France.

RICHARD C. QUEISSER, *Primary Examiner.*

E. D. GILHOOLY, *Assistant Examiner.*